United States Patent Office 3,248,324
Patented Apr. 26, 1966

3,248,324
REMOVING ORGANIC MATTER FROM
AQUEOUS WASTES
William A. Sweeney, San Rafael, Calif., assignor to
Chevron Research Company, a corporation of Delaware
No Drawing. Filed Feb. 20, 1964, Ser. No. 346,117
3 Claims. (Cl. 210—11)

This invention concerns a novel method for removing organic matter from aqueous wastes which contain surfactant.

The recovery of water from both domestic and industrial aqueous wastes is an imperative problem facing the crowded societies of today. With increasing consumption of a constant supply of water, it is necessary that the used water be made available for reutilization. Furthermore, since much of the aqueous waste is not readily disposable except by introduction into rivers, streams and lakes, in order to minimize pollution and conserve the fish and wildlife habitats, it is essential that a major portion of the organic matter be removed from the waste before introduction into this fresh water.

A common method for removing organic matter from aqueous waste is through the use of activated sludge, by which organic matter is degraded by the action of bacteria, i.e. by "biodegradation." See, for example, Sewage Treatment, 2nd edition, Imhoff and Fair (1956), John Wiley & Sons, Inc., New York, page 136. Basically, the process involves: (1) the continuous return of needed amounts of activated sludge to an aeration tank influent (return sludge) and the wasting of sludge in excess of these amounts (excess sludge or waste sludge); (2) the aeration of a mixture of sewage and activated sludge (mixed liquor) to keep it aerobic; (3) the stirring of the sewage/sludge mixture by air or mechanical agitation to maintain the floc in suspension and bring it into contact with suspended and dissolved matters to be removed from the sewage by the floc, usually for a period of about 4 to 10 hours; and (4) the sedimentation of the aeration tank effluent to separate the activated sludge solids from the water. A similar process can be used with a trickling filter.

While the activated sludge method is relatively efficient in removing most of the organic waste in sewage, it is relatively slow. In most sewage plants, a residence time of six hours is required for the activated sludge treatment. Even with this prolonged residence time, some materials, such as alkylbenzene sulfonates, particularly polypropylenebenzene sulfonates, resist biodegradation. Therefore, a method which would reduce the overall time required for the removal of organic waste material from sewage and/or improve the removal of materials resistant to biodegradation would be extremely advantageous.

Pursuant to this invention, it has now been found that organic matter can be rapidly and efficiently removed from aqueous waste, such as sewage, by:

Introducing the surfactant containing aqueous waste into a foaming zone;

Agitating the aqueous waste to form foam containing significant amounts of organic matter other than surfactants in an upper portion of said foaming zone;

Transferring the foam to a biological degradation zone;

Allowing the foam to remain in the biological degradation zone for a sufficient time to degrade a substantial portion of the organic material;

And obtaining as effluents from the biological degradation zone and a lower portion of the foaming zone an aqueous effluent having significantly reduced concentrations of organic matter.

The above process offers significant advantages when used by itself or in conjunction with a present day sewage plant. The foaming provides a foam containing relatively high concentrations of surfactants as well as other organic matter. Thus, only a small percentage of the total amount of water is diverted to the biological degradation zone. The major portion of the water is taken as an effluent from a lower portion of the foaming zone.

In the typical activated sludge treatment process, the aqueous wastes usually have a residence time of about 6 hours in the biological degradation zone. This requires that all of the aqueous waste to be purified must remain for a period of 6 hours in the activated sludge unit. However, in the process of this invention, only a small percentage of the volume of the aqueous waste is sent to the biological degradation zone. Therefore, a relatively long residence time is permitted in the biological degradation zone, while the entire unit handles a large volume of waste with a relatively short residence time.

The organic matter concentration can be further reduced by repeating the foaming process. Addition of foaming surfactants may be necessary with repeated foaming. Alternatively, the effluent from the foaming zone may be introduced into an activated sludge or trickling filter unit. The residence time in such a unit would be significantly reduced because the concentration of organic matter in the effluent is much lower as compared to that in the original aqueous waste.

The aqueous waste referred to in the disclosure is that containing significant amounts of biodegradable organic matter. The composition of aqueous waste will vary widely depending on its source. Most domestic sewage will have sufficient amounts of surfactant for efficient foaming. The amount of surfactant in the sewage will generally be at least 1 p.p.m. and usually 3 p.p.m. or higher. In common domestic sewage, the amount of surfactant will usually vary in the range of about 6 to 11 p.p.m. The biological oxygen demand (BOD) or oxygen required for biodegradation if the organic matter in the same sewage usually varies in the range of about 100 to 250 p.p.m. In comparison, the aqueous waste from some manufacturing plants, e.g., paper pulping, may have a large BOD but little or no surfactant. In these cases a foaming surfactant can be added prior to foaming.

With sewage which has large amounts of particulate matter, it is preferred to allow the particulate matter to settle in a sedimentation tank. The sedimentation tank effluent can then be introduced directly into the foaming zone.

Various methods may be used for agitating the surfactant containing aqueous waste to produce foam. Bubbling gas through a column of the waste is preferred. Alternatively, however, foam may be produced by stirring, cascading the liquid waste, pumping against a wall, etc. Only the preferred method, i.e., bubbling gas through the aqueous waste, will be fully described.

In the preferred method, the foaming zone can be varied widely in size and design, depending on the particular needs of the plant. The foaming zone will usually be at least 0.5 foot high and preferably be at least 1 foot high. For most purposes, the zone will be in the range of about 2 to 30 feet in height, but may be higher if desired.

The diameter of the zone will be dependent upon the height of the zone as well as the rate and volume of the waste to be treated. The greater the amount of waste which must be treated, the greater the diameter required, assuming a constant residence time and height. In some cases it is advantageous to have a foam fractionator with a large diameter lower zone and a smaller diameter upper zone.

The zone has an air inlet, usually at least 1 foot below the liquid surface, near the bottom of the zone, as well as an outlet for the purified water in a lower portion of the zone, an inlet for the aqueous waste at an intermediate portion, and an outlet in an upper portion for the foam, through which the foam is led to the biological unit.

Various improvements in design of the foaming zone can be made to improve the removal of the foaming surfactants as well as the other organic matter present. Reducing the currents in the upper portion of the foaming zone enhances the removal of the foaming surfactant and concomitant organic matter. This can be done by the introduction of baffles, such as a bundle of smaller diameter tubes at the upper liquid-vapor interface of the foaming zone.

The amount of gas, generally air, required will depend on the amount of foaming surfactants present, as well as the height and efficiency of the foaming zone in fractionating the surfactants and organic matter. The gas is measured as cubic feet of free air per gallon of waste treated. Amounts in the range of about 0.01 to 10 cubic feet per gallon are operative, while amounts in the range of about 0.1 to 5 cubic feet per gallon are preferred.

The gas is introduced into the foaming zone in the form of small bubbles, which rapidly rise through the aqueous waste carrying with them foaming surfactants as well as other organic matter. Bubbles as small as 0.05 mm. may be used and, depending on the size of the foaming zone, may be as large as 5 cm. However, the bubbles will usually be of the order of about 0.1 to 1 cm. diameter. Bubbles may be formed in a variety of ways, but they are most conveniently formed by passing the air through a coarse porous plate. The porous plate will be of a size to cover a sufficient cross-sectional area, so that a large portion of the aqueous waste in the foaming zone will be agitated by the gas.

The residence time of the aqueous waste in the foaming zone will depend on a variety of variables. However, there is no advantage in having extended residence times. Residence times of about ½ minute may be sufficient in some instances, although the residence time will usually be in the range of about 1 minute to 1 hour, more usually not more than 15 minutes.

The foam from the foaming zone may be transferred by simple overflow into a sloping trough providing gravity flow. Generally, however, the foam will be condensed and pumping means used to transfer the foam to the biological degradation zone.

Depending on the initial concentrations of organic matter, the concentration of foaming surfactants and other organic matter in the condensed foam will vary over a wide range. Ordinarily, the amount of foaming surfactant will be in the range of 50 to 500 p.p.m., while the amount of organic matter other than foaming surfactant, as measured by susceptibility to chemical oxidation (COD), will be in the range of 100 to 10,000 p.p.m., or higher. The amount of water which is usually carried with the foam is generally in the range of about 0.5 to 5% of the original volume of the aqueous waste.

It was surprising to find that activated sludge, which is basically comprised of soil bacteria, could be acclimated to the high concentrations of foaming surfactants and organic matter which is present in the condensed foam. It was also surprising to find that the bacteria could not only acclimate themselves to the higher concentration of the various organic materials, but would also degrade the more difficulty degradable surfactants as well as the other available readily biodegradable organic matter.

The process of this invention is dependent upon a biodegradation zone which is able to consistently degrade high concentrations of foaming surfactants and other organic waste matter which are concurrently present. The acclimation of the activated sludge to this novel substrate—high concentration of foaming surfactant and organic matter—can be achieved by slowly increasing the concentration of foaming surfactant which is fed as the influent into the biodegradation zone. The concentration of other organic matter can be increased concurrently or subsequent to the acclimation of the bacteria to the relatively high concentrations of foaming surfactants. Once the bacteria are acclimated to the novel substrate, the biological degradation zone is operated in a similar manner to an activated sludge treatment zone.

Air is introduced to provide oxygen and agitation of the system, usually at a rate of 1 to 20 cubic feet per gallon of aqueous foam waste. The activated sludge maintained in the system will generally be in the range of about 500 to 5000 p.p.m. The residence time in the biodegradation zone will usually be at least 6 hours, although depending on the particular sewage and the required effluent purity, shorter times may be employed. Generally, residence times will be of the order of 9 to 36 hours, more generally of from 12 to 24 hours.

Because a waste containing a high concentration of surfactant is a special feed, the activated sludge which develops from its different from a typical domestic sewage activated sludge. Some alterations in mechanical handling of the sludge may be required, but the basic pattern of repeated contact of the acclimatized sludge with the feed still applies.

There are numerous designs for the biological degradation unit or aeration tank which can be used, and these are well known in the art. As already indicated, the aeration rate, agitation, sludge concentration, residence time and other process variables would be similar to or within the range of values used in sewage and waste treatment, although some significant difference may be necessary, e.g., increase in residence time.

Obviously, foaming in the aerator may be a mechanical problem and installation of sprays or addition of defoamers may be useful.

The effluent taken from a lower portion of the foaming zone will preferably be further treated in an activated sludge or trickling filter unit. However, since the amount of organic matter is significantly reduced by the process of this invention, the residence times in the activated sludge unit can also be concomitantly reduced. In this way, by combining the two processes, i.e., the typical sewage treatment process and the process of this invention, the volume of material treated by the equipment which is available in most metropolitan sewage units can be greatly enhanced. The ultimate purity of the aqueous effluent can also be improved by adding to the typical sewage treating system a foaming unit and a small biological degradation unit which is acclimated to the relatively high concentrations of foaming surfactant and organic matter.

The following examples are by way of illustration and are not intended to be limiting.

EXAMPLE 1

The following example demonstrates the removal of surfactants by foaming. A small-scale foaming apparatus for laboratory use was constructed. It consisted of a 2-liter round flask equipped with a Vigreux column, approximately 50 cm. long and 2 cm. wide. Atop the Vigreux column was fitted a 1-liter round flask with a 0.8 cm. tubular outlet through which the foam was passed into a receiver. The influent was fed near the middle of the 2-liter flask while effluent was withdrawn from the bottom of the flask. Aeration was accomplished by injecting humidified air through an air dispersion tube extending to the bottom of the 2-liter flask. Air rates were measured on a flow meter and were adjusted so that the liquid column in the Vigreux column never lost continuity with the bulk liquid in the 2-liter flask.

Wtih a feed solution containing 10 p.p.m. of ABS, wherein the ABS is predominantly sodium tetrapropylene benzene sulfonate, air was introduced at a rate of about 500 to 600 ml. per minute. The residence time for the feed solution was maintained at about 2 hours. The effluent was found to have about 1 p.p.m. of ABS. When the time was increased to 11.5 hours, the ABS concentration in the effluent dropped to 0.45.

With a feed containing 3 p.p.m. of ABS and a residence time of 2.6 hours, the concentration of ABS in the effluent was reduced tenfold to 0.3 p.p.m., and ABS concentration in the foam was 1.24%.

EXAMPLE 2

In a laboratory-sized activated sludge apparatus, water containing alkylbenzene sulfonate (ABS) as the main organic constituent was treated to give a final effluent of lowers ABS concentration. The apparatus consisted of a U-tube reactor further connected with a crossarm recycle tube about 62 mm. above the base connection. One arm of the U-tube, the aerator, consisted of a glass reaction vessel 65 mm. in diameter and 340 mm. in length. This portion of the reactor had three rows of indentations approximately 55 mm. apart and was equipped with a mechanical stirrer with paddle blades located in opposition to the above-mentioned indentations. An air inlet at the base of the aerator was provided with a sintered glass cover for gas dispersion; and a gas outlet tube was located in the top of the aerator. A liquid inlet tube was located 80 mm. below the top of the aerator. A thermometer well was provided for temperature measurement.

The other arm of the U-tube reactor was a settling vessel, 150 mm. in length and 40 mm. in diameter. The crossarm connection to the aerator was 42 mm. above the base of this settling vessel. A U-connection tube extended from the bottom of the aerator to the bottom of the settling vessel.

To the constantly stirring aerator of this apparatus there was charged 700 ml. of water containing 180 p.p.m. of Lodi, California, activated sludge and 4000 p.p.m. of shredded Whatman No. 2 filter paper. Air was bubbled into the aerator at an average rate of 10 ml. per minute. The entire system was maintained at a temperature of about 70° F.

Feed was passed into the aerator through the side inlet at a rate of 30 ml. per hour, thereby giving an average residence time in the aerator of 24 hours. This feed consisted of Lodi sewage treatment (activated sludge) effluent (essentially free of particulate matter) which contained 150 p.p.m. of $S^{35}$-tagged tetrapropylene benzene sulfonate.

The effluent from the settler was analyzed for ABS concentration by the method of House and Fries [reference "Sewage and Industrial Wastes," 28, 492 (1956)] throughout a 20-day run. These analyses showed that 20 to 30% of the ABS was continuously destroyed, indicating that a biodegradation unit fed mainly ABS can sustain itself and destroy ABS.

EXAMPLE 3

This example was carried out essentially the same as Example 2 except that the tetrapropylene benzene sulfonate was replaced by 150 p.p.m. $S^{35}$-tagged $C_{10-13}$ straight chain alkylbenzene sulfonate (SCABS). In this example the average residence time was maintained at 18 hours and the air rate to the aerator averaged 18 ml. per minute.

The run was continued for 70 days. Periodic analysis of the effluent showed gradual improvement in ABS removal for about 30 days after which about 98% of the SCABS was being destroyed by the aerator.

EXAMPLE 4

In a sewage treating system for purifying 1,500,000 gallons of water per day, an aeration tank is used of approximately 250,000-gallon capacity. The sewage has a chemical oxygen demand (COD) of about 300 to 350 p.p.m. after primary settling. The ABS concentration of the sewage introduced is on an average about 5 to 10 p.p.m. The sewage is first pumped to a foaming vessel having a capacity of about 10,000 gallons. The vessel is approximately 13 feet in diameter and about 10 feet high, enclosed at both ends. At the bottom of the foaming vessel are several air inlets fitted with coarse porous plates. The sewage is pumped to a point about 8 feet from the bottom of the vessel. This point is about 1 foot below the liquid level. Air is passed into the column at a rate of about 0.4 cubic foot per gallon of sewage. The flow of liquid is maintained at a rate which permits a residence time in the column of about 10 minutes. The treated sewage water is removed from the vessel through an outlet at about 1½ feet from the bottom of the vessel. The water obtained has 200–250 p.p.m. COD and 1 to 5 p.p.m. of alkylbenzene sulfonate.

It is fed to a conventional activated sludge plant of 250,000-gallon capacity or to a trickling filter unit. The capacity of these plants is increased by about ⅓ because of the reduced COD level. The foam stream which is obtained has ABS in a range of about 200 to 250 p.p.m. and an amount of water which is about 2% of the total sewage treated. The foam stream is fed to a small biological unit (25,000 gallons) where it is treated with activated sludge acclimated to that feed and about 1 to 10 cubic feet air per gallon. About 60% of polypropylene ABS and 80% of the COD in the foam stream is removed in this unit.

EXAMPLE 5

Using the apparatus described in Example 2, the sludge developed in Example 3 was acclimated to a high polypropylene ABS feed in the following manner. For a period of 4 days, a feed of Lodi sewage treatment effluent containing an added 3 p.p.m. of a polypropylene-benzene sulfonate was introduced, with a residence time of 18 to 20 hours. For the next 3 days, the amount of sulfonate was increased to 10 p.p.m., the effluent on the last day showing only 11.6% of the benzene sulfonate remaining. The feed was then increased to 25 p.p.m. for the succeeding 34 days, the effluent on the last day containing only 16.8% of the benzene sulfonate in the feed. For the next 12 days, the feed contained 50 p.p.m. with only 17.4% remaining, the next 12 days 100 p.p.m. with only 14.1% remaining, and the next 10 days the feed was maintained at 150 p.p.m. with 14.6% of the surfactant remaining on the last day.

This shows that after the sludge is properly acclimatized, considerably high polypropylene ABS removals can be achieved than were shown in Example 2.

EXAMPLE 6

The activated sludge developed in Example 5 was now exposed to a feed containing 150 p.p.m. polypropylene ABS and a high level of other organic material produced by foaming primary settled sewage. The feed of Example 5 was gradually displaced by the new feed in a step-wise manner by first using 20%, then 40%, then 100% of the new feed over a period of 6 days. After this rather brief acclimatization period, the new feed was fed continuously with the following results:

Table I

| Feed | Days | Air Rate, ml./min. | ABS Determination, Percent Remaining | | COD | | BOD | |
|---|---|---|---|---|---|---|---|---|
| | | | $S^{35}$ | Methylene Blue [1] | P.p.m. | Percent Remaining | P.p.m. | Percent Remaining |
| ABS—150 p.p.m | 0 | | | | | | | |
| COD—3,420 p.p.m | 2 | 20 | 46 | 52 | 785 | 23 | | |
| BOD—855 p.p.m | 3 | 20 | 48 | 55 | 669 | 20 | | |
| | 4 | 62 | 53 | | | | | |
| | 5 | 120 | 61 | 57 | 933 | 27 | | |
| | 6 | 124 | 60 | 55 | 1,072 | 31 | 155 | 18 |
| | 7 | 200 | 62 | 53 | 1,156 | 34 | | |
| | 8 | 200 | 66 | | 940 | 28 | | |

[1] Standard Methods for the Examination of Water and Wastewater, Amer. Pub. Health Assn., 11th Ed., 1960, pp. 246–248.

The effluent from the last 5 days' treatment was recycled to the biodegradation zone along with 5 to 10% of the previous feed for the final period of 4 days. During this period, the ABS remaining dropped from 61 to 40% and the COD remaining dropped to an average of 790 p.p.m. or 23% of the original feed COD.

The above data show that by foaming a raw settled sewage, followed by biological treatment of the foam stream, significant removal of both foaming surfactants and other organic materials can be achieved. The residence time in the foamer was 20 minutes, in the biological unit it was 20 to 22 hours initially, while at the end of the study it was increased to 30 to 35 hours during the recycle of effluent stage. Further enhancement of the method could be achieved by allowing an increased amount of time for the biological system to become thoroughly acclimated to the novel feed. Improvements in construction and design of the biological zone would also help. The method of this invention provides a novel and useful way for treating sewage and enhancing the usefulness and production of already existing equipment in sewage plants.

As will be evident to those skilled in the art, various modifications on this process can be made or followed, in the light of the foregoing disclosure and discussion, without departing from the spirit or scope of the disclosure or from the scope of the following claims.

I claim:

1. A method of removing organic matter from aqueous waste which contains surfactants and other organic matter, which method comprises:

introducing said aqueous waste into a foaming zone;
   passing gas through the aqueous waste to form foam containing significant amounts of surfactants as well as other organic matter in an upper portion of said foaming zone;
   transferring the foam to a biological degradation zone which has been acclimated to said surfactant-containing foam by slowly increasing the concentration of foaming surfactant which is fed as an influent into said degradation zone;
   allowing the foam to remain in the biological degradation zone for a sufficient time to degrade a substantial portion of the surfactant and other organic matter;
   and obtaining as effluents from the biological degradation zone and the lower portion of the foaming zone an aqueous effluent having significantly reduced concentrations of surfactants and other organic matter.

2. A method according to claim 1 wherein the effluents from the biological degradation zone and the lower portion of the foaming zone are fed into an activated sludge unit.

3. A method according to claim 1 wherein the surfactant concentration in the aqueous waste is at least 3 p.p.m.

References Cited by the Examiner

Eldib: Foam Fractionation for Removal of Soluble Organics From Wastewater, Journal WPCF, September 1961, vol. 33, pp. 914–931.

House et al.: Sewage and Ind. Wastes, 28, 492 (1956).

McGauhey et al.: Removal of ABS by Sewage Treatment, Sewage and Ind. Wastes, August 1959, vol. 31, pp. 877–899.

MORRIS O. WOLK, *Primary Examiner.*